US006462113B2

(12) United States Patent
Elser et al.

(10) Patent No.: US 6,462,113 B2
(45) Date of Patent: *Oct. 8, 2002

(54) PLASTISOLS WITH CROSS-LINKING AGENTS

(75) Inventors: Wilhelm Elser, Riedlingen/Do; Guenther Schmitt, Darmstadt; Ursula Rausch, Griesheim; Theodor Mager, Darmstadt, all of (DE)

(73) Assignee: Roehm GmbH & Co. KG, Darmstadt (DE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/986,645

(22) Filed: Dec. 8, 1997

(65) Prior Publication Data

US 2001/0044491 A1 Nov. 22, 2001

(30) Foreign Application Priority Data

Dec. 7, 1996 (DE) .......................................... 196 50 939

(51) Int. Cl.$^7$ ................................................ C08K 5/52
(52) U.S. Cl. .................. 524/143; 523/400; 524/114; 524/141; 524/147; 524/158; 524/287; 524/291; 524/296; 524/297; 524/298; 524/310; 524/311; 524/314; 524/423; 524/425; 524/430; 524/433; 524/435; 524/445; 524/447; 524/451; 524/492; 524/493; 524/494; 524/535; 524/558; 524/559; 524/560; 524/561; 524/832; 524/833

(58) Field of Search ................................ 524/558, 559, 524/560, 561, 535, 832, 833, 310, 311, 314, 114, 141, 143, 147, 158, 296, 494, 425, 423, 287, 291, 297, 298, 435, 430, 433, 445, 447, 451, 492, 493; 523/400

(56) References Cited

U.S. PATENT DOCUMENTS

| 4,071,653 A | * | 1/1978 | Boessler et al. ............. 428/332 |
| 4,199,486 A | * | 4/1980 | Boessler et al. ............. 525/309 |
| 5,298,542 A | * | 3/1994 | Nakamura et al. .......... 524/297 |
| 5,441,994 A | * | 8/1995 | Morig et al. ................. 523/201 |

* cited by examiner

Primary Examiner—Judy M. Reddick
(74) Attorney, Agent, or Firm—Oblon, Spivak, McClelland, Maier & Neustadt, P.C.

(57) ABSTRACT

Copolymerizates of methyl methacrylate and butyl methacrylate are used as plastisols in the automotive sector and as floor coverings. The invention describes a way to increase the storage stability of the plastisols by using small amounts of cross-linking agents.

9 Claims, No Drawings

PLASTISOLS WITH CROSS-LINKING AGENTS

BACKGROUND OF THE INVENTION

1. Field of the Invention

The invention relates to plastisols based on PMMA polymer masses plasticized by means of the addition of a plasticizer, which additionally also contain a cross-linking component.

2. Discussion of the Background

Plastisols are two-phase systems consisting of plastic or synthetic resin particles and a suitable plasticizer or plasticizer mixture. They can theoretically be produced from many different plastics, but the technically most important applications have always been restricted to polymer systems. Copolymerizates of polyvinyl chloride and other vinyl-unsaturated monomers are known and find broad application. A disadvantage of these materials is their chlorine content, which has a corrosive effect under certain conditions. These plastisols are also known as PVC plastics, plastisols, organosols, or plastigels (see also Ullmann's Encyclopedia of Industrial Chemistry, 5th Ed., Vol. A21, pages 734–737, VCH 1992; Becker-Braun, Kunststoff-Handbuch (Plastics Handbook), 2nd edition, vol. 2/2, pages 1077–1090, C. Hanser 1986; F. Mark et al., Encyclopedia of Polymer Science & Engineering, 2nd Ed. Supplem. Vol. pages 568–643, Wiley-Interscience 1989, and Saechtling, Kunststoff Taschenbuch (Plastics Pocket Book), Carl Hanser Verlag, Munich, 26th edition, (1995), pages 406 ff.).

Copolymerizates based on methyl methacrylate and butyl methacrylate, so-called PAMA plastisols, are used with great success for plastisols in the automotive sector. The plastisols are used as adhesive plastisols, sealing masses, welding pastes, and undercoats, and also as floor coverings. But plastisols on an acrylate basis have also been available for some time (cf. DE-PS 934 498, FR-A 2,291,248). The latter state of the art is based on the recognition that coordination of the glass temperature Tg, particle size, and composition of the polymer particles, on the one hand, and of special plasticizers on the other hand, is required for the production of acceptable PAMA plastisols.

In this connection, the rule is established that the average grain size of the polymerizate must be all the greater, the lower its glass temperature Tg. The average grain size of the polymer used must be between 0.1 $\mu$m and 500 $\mu$m, preferably between 0.3 and 20 $\mu$m, according to the FR-A. Both suspension-polymerized and emulsion-polymerized acrylic polymers are indicated as suitable primary particles.

DE-A 25 43 542 also describes PAMA plastisols, preferably with basic comonomers in a particle size range of 0.1 to 200 $\mu$m, which are preferably obtained as emulsion polymerizates. Particles from 0.1 to 20 $\mu$m, particularly up to 10 $\mu$m, are especially preferred, but can only be produced by emulsion polymerization, according to this reference. Another modification of the PAMA plastisols is proposed in DE-A 27 72 752 and 29 49 954. This involves core/shell polymerizates with a plasticizer-compatible core and a shell which is less compatible with plasticizer. In U.S. Pat. No. 4,558,084, a plastisol based on a copolymerizate of methyl methacrylate and itaconic acid, i.e. itaconic acid anhydride is described; it is said to have particularly good adhesion on electrophoretically pre-treated metal surfaces. Recently, floor coverings based on PAMA plastisols have been proposed, in which a pure polymethyl methacrylate (PMMA) is used as the matrix material, used partly in the form of emulsion polymerizate, partly in the form of suspension polymerizate (DE-A 39 03 669).

As was shown in EP-A 477 708, a plastisol with improved product quality and greater application breadth can be obtained by simultaneous use of spray-dried polymer dispersions and bead polymerizate obtained in suspension polymerization, at least one of which represents a methyl methacrylate copolymerizate.

Further studies in the field of PAMA plastisols served to improve the adhesion strength, particularly on metallic substrata, for example by also using 2.5–10% by weight polyamide resins (polyaminoamides) (cf. EP-A 533 026). EP-A 121.759 also recommends polyamide resins as protective colloids for improving the storage stability of plastisols. Other references aim at improving the adhesion properties, for example by installation of glycidyl (meth) acrylate, among other things, into the PAMA polymer (US-PS 5,120,795), or at improving the plasticizer compatibility by incorporation of isobutyl methacrylate as a comonomer (EP-A 477 708; EP-A 539.031). DE-OS 24.54.235 (Teroson GmbH) describes non-cross-linked plastisols of methyl methacrylate and butyl methacrylate for use as undercoats in automobile construction. DE-OS 25.43.542 (Röhm GmbH) describes a non-cross-linked copolymer of methyl methacrylate and butyl methacrylate as well as vinyl imidazole as the adhesion mediator. Chalk is used as the filler, the plastisol is used for coating metals. DE-OS 28.12.016 (du Pont) describes non-aqueous, non-cross-linked plastisols of methyl methacrylate and methacrylic acid. After they gel, a clear film is obtained. DE-OS 27.22.752 (Röhm GmbH) describes a plastisol with a core/shell structure. The core consists of a copolymer of methyl methacrylate, butyl acrylate, and butyl methacrylate, the shell consists predominantly of methyl methacrylate. DE-OS 28.812.014 (du Pont) describes a photosensitive plastisol of methyl methacrylate and methacrylic acid.

DE-OS 29.101.53 (Bayer AG) describes a cross-linked acrylate rubber, which is worked into a dispersion. DE-OS 39.00.933 (BASF AG) describes plastisols of methyl methacrylate, alkyl methacrylate, unsaturated esters of monocarboxylic or dicarboxylic acids, glycidyl methacrylate, and monomers which contain basic nitrogen groups or hydroxy groups. DE-OS 40.300.80 describes a mixture of a spray-dried dispersion and a spray-dried suspension of methyl methacrylate and alkyl methacrylates, on the one hand, and butyl methacrylate and methyl methacrylate, on the other hand. An adhesion-imparting monomer, for example vinyl imidazole, can be optionally added. EP 544 201 (Nippon Zeon Co. Ltd.) describes a plastisol mixture of alkyl methacrylates and dienes, such as butadiene and isoprene. Sulfur or ZnO serves as an optional cross-linking agent. Cross-linking takes place via the carboxyl groups.

From DE 39 03 670 (Pegulan AG), floor coverings are known which consist of PMMA and benzyloctylphthalate as the plasticizer. These plastisol mixtures are heated to 120° C. and immediately processed further to produce the floor covering. There is no information concerning stabilization of the plastisol.

Disadvantages of the State of the Art

It is disadvantageous in this connection that a large number of technically important and frequently used plasticizers cannot be used for PMMA plastisols, since the plastisols produced with them are not sufficiently stable. The relevant parameter here is the viscosity increase of the plastisols, which makes processing of the products more difficult.

SUMMARY OF THE INVENTION

One object of the present invention is to provide chlorine-free plastisols with good mechanical properties, a broad freedom of movement for processing, a constant viscosity over the processing period, and one in which the added plasticizer does not sweat out. Sweating results in unattractive color changes at the surface of the plastisols and impairs their usage properties.

DETAILED DESCRIPTION OF THE PREFERRED EMBODIMENTS

The above objects are provided by a copolymerizate comprising:

(1) 39–99% by weight of a methacrylic acid methyl ester, and
(2) 60–0% by weight of esters of methacrylic acid or acrylic acid with saturated, aliphatic alcohols, wherein the alcohols can have a chain length of 2–6 carbon atoms and the carbon chain can be branched; butyl methacrylate and isobutyl methacrylate being especially preferred,
(3) 0.05–1% by weight of a cross-linking agent or a mixture of cross-linking agents, as well as (4) 50–200% by weight of plasticizer, based on the total amount of components (1)–(3).

The following substances can be used as cross-linking agents:

allyl(meth)acrylate
triallyl cyanurate
trimethylol propane trimethacrylate
ethylene glycol dimethacrylate
1,4-butane diol dimethacrylate
pentaerythritol trially ether.

Mixtures of the aforementioned substances can also be used.

When using the esters of acrylic acid, the proportion of acrylic acid esters should be adjusted in such a way that the solidification temperature does not drop below the practically useful limit of a Tg of 60–65° C.

The plasticizers used in PVC technology can be used as plasticizers, such as, for example:

phthalate plasticizers, such as dioctyl phthalate, di-isoheptyl phthalate, di-2-ethylhexyl phthalate, di-isooctyl phthalate, or di-isononyl phthalate, esters of aliphatic dicarboxylic acids, such as adipic, azelaic, and sebacic acid esters, phosphoric acid esters, such as tricresylphosphate or tri-2-ethylhexylphosphate, or diphenylisodecylphosphate, alkyl sulfonic esters of phenol, citric acid esters, such as acetyl tributylcitrate or tributylcitrate, trimellitates, such as tri-2-ethylhexyltrimellitate or tri-isooctyltrimellitate, epoxidized products, such as epoxidized fatty acid esters, epoxidized linseed oil, or epoxidized soybean oil, polyester plasticizers, such as polyesters of (propyl, butyl, pentyl, and hexyl)diols with dicarboxylic acids.

The Plasticizers can also be used as Mixtures

Primarily, plasticizers with a low polarity are good for use, such as the alkyl esters of phthalic acid, adipic acid, sebacic acid, chlorinated paraffins, trialkyl phosphates, aliphatic or araliphatic polyesters, in addition to plasticizers with a medium polarity such as higher polyglycols, phthalic acid polyesters or adipic acid polyesters, and many more.

It can apply as general information that as a rule, all the plasticizers suitable for PVC can also be used, with the group of phthalate plasticizers being particularly emphasized because of their outstanding technical importance.

A detailed description of suitable plasticizers is found in Kunststoff-Handbuch (Plastics Handbook), published by H. K. Felger, Vol. 1/1, C. Hanser Verlag, 1985, as well as in H. F. Mark et al., Encyclopedia of Polymer Science and Engineering, Supplemental Volume, pages 568–647, J. Wiley 1989. A selection of suitable plasticizers can also be derived from DE-C 25 43 542.

Diisodecylphthalate, benzyloctylphthalate, and dioctylphthalate should be particularly mentioned. As was already explained above, the plasticizers are used in proportions of 40 to 200 parts by weight to 100 parts by weight of the polymers P.

Production of the Products According to the Invention

These are spray-dried emulsion polymerizates. The production of the spray-dried emulsion polymerizates takes place in accordance with the production regulations described as examples in EP 477 708 and EP 154 189.

Polymerization takes place in a VA-vat provided with a water circulation heating system, at 80° C. The stirring speed is 45 revolutions/minute. Emulsification takes place in a VA-vat with a propeller stirrer at approximately 1300 revolutions/minute.

To improve special coating technology properties, such as adhesion, hardness, resistance to water and salt mist, small amounts of polyaminoamides and/or masked polyisocyanates can also be added.

The following monomers can also be contained in the polymer, in small amounts: unsaturated carboxylic acids, such as methacrylic acid or acrylic acid can be added, furthermore hydroxyalkyl methacrylates such as hydroxyethyl methacrylate, for example; also, acrylonitrile, vinyl imidazole, or 2-dimethylaminoethyl methacrylate.

Depending on the area of application, the plastisols are used in the unpigmented state (e.g. floor coverings) or in the pigmented or filled state (e.g. undercoat masses). In the case of the pigmented or filled masses, the proportion of pigments and fillers is generally up to 400, preferably up to 200 parts by weight per 100 parts by weight of the polymer mass. Possible fillers are primarily chalk, along with barite, kaolin, silicon dioxide in various modifications, silicates or sand, talcum, clays such as bentonite, glass powder, aluminum oxide or hydrated forms of it. Possible pigments are $TiO_2$, iron oxides, and carbon black. It is advantageous to use the fillers or pigments in a suitable particle size, for example in the range of 0.2 to 30 μm. (Determined according to Ullmann's Encyclopädie der techn. Chemie (Encyclopedia of Technical Chemistry), 4th edition, Vol. 5, pages 725–752.) The grain size distribution can be determined by measuring the light extinction of a suspension of the particles in water flowing through a cell (e.g.,"Kratel Partoskop F" manufactured by Kratel GmbH, Göttingen). The fillers can be precipitated and/or ground, and coated if necessary, Furthermore, the plastisols can contain conventional additives, for example dispersion aids, viscosity regulators such as emulsifiers and silicones, stabilizers to protect them against heat, light, and oxidation. The production of foamed plastisols by means of adding propellants such as azo compounds, for example, is also possible.

To characterize the molecule size, the $n_{sp/C}$ value (Makromolekular Chemie (Macromolecular chemistry) 7, p. 294, 1952), measured at 20° C. in chloroform or in nitromethane, can be used. The $n_{sp/C}$ values generally lie in the range of 120 to 600 ml/g.

Advantageous Effects

The plastisols according to the invention are suitable for all those applications indicated for PVC and PAMA plastisols.

Use as a contact layer for floor coverings, by application on a suitable carrier, is particularly emphasized. Furthermore, free transparent films which can be produced from these plastisols are of technical interest. Furthermore, applications for wall coverings, plastic tarpaulins (truck tarpaulins), car interior roof linings, dashboard paneling and many others are also of interest. The expanded processability range of the plastisols is particularly important. The following table shows the great constancy in viscosity of the copolymerizates according to the invention after storage:

TABLE

| Composition of the copolymerizate | Weight ratios of the monomers | Weight ratio between monomer/ plasticizer | Viscosity in mPas after prod. | after 4 hours of storage |
|---|---|---|---|---|
| Comparative Example | | | | |
| methyl methacrylate/ butyl methacrylate | 80/20 | 55/45 | 3,520 | 30,475 |
| Invention Example | | | | |
| methyl methacrylate/butyl methacrylate/allyl methacrylate | 79.95/20/0.05 | 55/45 | 4,830 | 19,113 |
| Invention Example | | | | |
| methyl methacrylate/butyl methacrylate/allyl methacrylate | 79.90/20.00/0.1 0.15 0.2 | 55/45 55/45 55/45 | 3,113 3,142 2,851 | 12,363 6,038 5,324 |
| Invention Example | | | | |
| methyl methacrylate/butyl methacrylate/ triallyl cyanurate | 79.95/20/0.5 | 55/45 | 4,277 | 14,950 |
| Invention Example | | | | |
| methyl methacrylate/butyl methacrylate/ triallyl cyanurate | 79.90/20/0.1 | 55/45 | 2,880 | 19,263 |

In all the examples, a mixture of diphenylisodecylphosphate and tributylcitrate in a ratio of 2:1 to 1:2 is used as the plasticizer.

The examples above show the positive effect of using a cross-linking agent on the storage stability of the plastisols according to the invention. The non-cross-linked plastisol shows a dramatic increase in viscosity, putting further processability into doubt, while the viscosity increase of the cross-linked plastisols stays within reasonable limits. The processability of the plastisols produced in this way is still good after 4 hours.

The viscosity of the copolymerizates according to the invention is supposed to be in the range between 10,000–20,000 mPa after 4 h, with a range of 15,000–25,000 mPa being preferred. It is not evident that the plasticizer sweats out.

Obviously, numerous modifications of the invention are possible in light of the above teachings. Therefore, it is to be understood that within the scope of the appended claims, the invention may be practiced otherwise than specifically described herein.

What is claimed is:

1. A plastisol of a copolymerizate consisting of:
    a)
        (1) 39–99% by weight of a methacrylic acid methyl ester;
        (2) 60–0% by weight of a methacrylic acid ester or an acrylic acid ester, esterfied with a saturated aliphatic $C_2$–$C_6$ straight or branched chain alcohol, wherein component (a)(2) is selected from the group consisting of butyl methacrylate and isobutyl methacrylate;
        (3) 0.05–1% by weight of a cross-linking agent selected from the group consisting of 1,4-butanediol dimethacrylate, glycol-dimethacrylate, allyl(meth)acrylate, triallylcyanurate, trimethylolpropane trimethacrylate, pentaerythritol triallyl ether, ethyleneglycol dimethacrylate, and mixtures thereof; and
        (4) optionally, a monomer selected from the group consisting of an unsaturated carboxylic acid, a hydroxyalkyl methacrylate, acrylonitrile, vinyl imidazole and 2-diethylaminoethyl methacrylate;
    b) 50–200% by weight of a plasticizer, based on the total amounts of components (1)–(3); and
    c) an optional additive selected from the group consisting of a filler, a pigment, a dispersion aid, a viscosity regulator, a stabilizer and a propellant.

2. The plastisol of claim 1, wherein said plasticizer is selected from the group consisting of a phthalate, an ester of an aliphatic dicarboxylic acid, a phosphoric acid ester, an alkyl sulfonic ester of phenol, a citric acid ester, a trimellitate, an epoxidized compound and a polyester plasticizer.

3. The plastisol of claim 2, wherein said plasticizer is a phthalate selected from the group consisting of di-octyl phthalate, di-isoheptyl phthalate, di-2-ethylhexyl phthalate, di-isooctyl phthalate, di-isononyl phthalate, di-isodecyl phthalate and benzyloctyl phthalate.

4. The plastisol of claim 3, wherein said phthalate is selected from the group consisting of di-isodecyl phthalate, di-octyl phthalate, and benzyloctyl phthalate.

5. The plastisol of claim 1, having a filler therein, which filler is selected from the group consisting of chalk, barite, kaolin, silicon dioxide, silicates, talcum, clay, glass, powder and aluminum oxide and hydrates of aluminum oxide.

6. The plastisol of claim 1, having a pigment therein, which pigment is selected from the group consisting of $TiO_2$, iron oxides and carbon black.

7. The plastisol of claim 5, wherein said filler has a particle size range of 0.2 to 30 µm.

8. The plastisol of claim 1, having a propellant therein.

9. A floor covering, comprising a plastisol of a copolymerizate consisting of:
    a)
        (1) 39–99% by weight of a methacrylic acid methyl ester;
        (2) 60–0% by weight of a methacrylic acid ester or an acrylic acid ester, esterfied with a saturated aliphatic $C_2$–$C_6$ straight or branched chain alcohol, wherein component (a)(2) is selected from the group consisting of butyl methacrylate and isobutyl methacrylate;
(3) 0.1–1% by weight of a cross-linking agent selected from the group consisting of 1,4-butanediol dimethacrylate, glycol-dimethacrylate, allyl(meth) acrylate, triallylcyanurate, trimethylolpropane trimethacrylate, pentaerythritol triallyl ether, ethyleneglycol dimethacrylate, and mixtures thereof; and
(4) optionally, a monomer selected from the group consisting of an unsaturated carboxylic acid, a hydroxyalkyl methacrylate, acrylonitrile, vinyl imidazole and 2-dimethyl aminoethyl methacrylate;

b) 50–200% by weight of a plasticizer, based on the total amounts of components (1)–(3); and c) an optional additive selected from the group consisting of a filler, a pigment, a dispersion aid, a viscosity regulator, and a plasticizer.

* * * * *

UNITED STATES PATENT AND TRADEMARK OFFICE
CERTIFICATE OF CORRECTION

PATENT NO.    : 6,462,113 B2
DATED         : October 8, 2002
INVENTOR(S)   : Elser et al.

It is certified that error appears in the above-identified patent and that said Letters Patent is hereby corrected as shown below:

<u>Title page,</u>
Item [75], should read:
-- [75] Inventors: Wilhelm Elser, Riedlingen/Do;
Guenter Schmitt, Darmstadt; Ursula Rausch, Griesheim; Theodor Mager, Darmstadt, all of (DE) --

Signed and Sealed this

First Day of June, 2004

JON W. DUDAS
*Acting Director of the United States Patent and Trademark Office*